United States Patent
Myers (10) Patent No.: US 7,113,597 B2
(45) Date of Patent: Sep. 26, 2006

(54) SYSTEM AND METHOD FOR PROTECTION OF VIDEO SIGNALS

(75) Inventor: Robert L. Myers, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 918 days.

(21) Appl. No.: 10/280,592

(22) Filed: Oct. 24, 2002

(65) Prior Publication Data

US 2004/0083376 A1 Apr. 29, 2004

(51) Int. Cl.
*H04N 7/167* (2006.01)

(52) U.S. Cl. ............... 380/201; 380/224; 380/239; 380/210

(58) Field of Classification Search ............ 380/201, 380/224, 239, 210
See application file for complete search history.

(56) References Cited

U.S. PATENT DOCUMENTS

| | | | |
|---|---|---|---|
| 6,345,099 B1 * | 2/2002 | Alvarez | 380/203 |
| 6,996,236 B1 * | 2/2006 | England et al. | 380/213 |
| 2002/0138749 A1 * | 9/2002 | Koguchi et al. | 713/191 |
| 2003/0138102 A1 * | 7/2003 | Kohn et al. | 380/213 |
| 2003/0145336 A1 * | 7/2003 | Matsuzaki et al. | 725/136 |
| 2004/0218759 A1 * | 11/2004 | Yacobi et al. | 380/210 |
| 2005/0207577 A1 * | 9/2005 | England et al. | 380/213 |

* cited by examiner

*Primary Examiner*—Gilberto Barron
*Assistant Examiner*—Samson Lemma
(74) *Attorney, Agent, or Firm*—Richard P. Lange (57) ABSTRACT

A method and system are provided for protecting an analog video signal sent from a video signal source to a video display enabled to receive a protected video signal. The method includes sending a string of bit values in an encrypted format from the video display to the video signal source. The string of bit values is received in the video signal source and decrypted. The string of bit values is then divided into multi-bit segments in both the video display and the video signal source. A common multi-bit segment in the string of bit values is selected for both the video display and video signal source. A plurality of analog video channels is then sent in a switched order from the video signal source to the video display based on the common multi-bit segment. The plurality of analog video channels is finally decoded in the video display using the common multi-bit segment to decode the switched order.

23 Claims, 5 Drawing Sheets

SYSTEM AND METHOD FOR PROTECTION OF VIDEO SIGNALS

FIELD OF THE INVENTION

The present invention relates generally to the protection of video signals.

BACKGROUND

Video signals that contain television content, movies and other program content have been encrypted in many ways because such signals can be easily transmitted and copied electronically. Content providers who create electronic video content frequently encrypt their products or the associated audio/video signals in order to discourage others from copying those signals. These copy protection methods have met with a certain amount of success in discouraging end users or unlawful copiers from copying copyrighted material.

One way video content has been copy protected is by encrypting or encoding the actual video content as it is saved to a specific media. For example, the data stored on DVDs is encrypted with the CSS algorithm before it is stored on a DVD. Then when the information is played back from the DVD, it is unencrypted by the DVD player with the CSS algorithm and sent via a cable to the video display or television monitor. Such encryption systems have generally been effective in those situations where an individual desires to copy the video data directly from the source material (e.g. DVD).

Unfortunately, source level encryption does not protect the data from being copied in the situation where the information has been decrypted and is then being sent directly across the cable to the video display. In this situation, a knowledgeable individual can tap into the video cable between the video player or source and the video display while the image is being sent in its clear format. In this situation, a cable tap or splitter can be used to copy the signal just before it arrives at the video display. Alternatively, a copying machine can act as the video display and can intercept the direct output. This type of copying system enables the copier to avoid copy protections and copy a clean signal with very inexpensive hardware.

Some analog scrambling systems have been developed for satellite transmissions and for video tape copy protection. For example, some satellite signal copy protection systems strip away the vertical and/or horizontal sync pulses prior to sending the signal. Such copy protection systems send a reference sync signal or pilot signal and the decryption unit can then generate the missing sync signals from the reference signal. Without these control signals, analog video displays or televisions are unable to determine when to trace each new line in the frame or when a new frame begins.

Video tape systems use a similar copy mechanism so that when a video tape is copied the sync pulses are difficult to copy or otherwise modify so that they are not able to be copied properly. This results in a fuzzy or scrambled final picture on a copied tape.

Regardless of what type of scrambling or protection system is used for a video signal, there are some central components of video protection systems. Video protection systems tend to include an encoder to scramble, encrypt, or modify the video signal in some way. A central broadcast system or signal source device is also part of a protection system for distributing the video signals. In addition, at least one descrambler is typically located at the point where the video signal will be used. For satellite television or cable television, a descrambler is most often located with the video display that will display the signal. Accordingly, the video signal is generally decrypted just before it is sent across the analog transmission line to the video display or the television monitor. This means that the video display does not know anything about the scrambled signal that is sent to the descrambler unit because the signal has been descrambled before it is ever sent to the analog video display.

SUMMARY OF THE INVENTION

The invention provides a method for protecting an analog video signal sent from a video signal source to a video display enabled to receive a protected video signal. The method includes the step of sending a string of bit values in an encrypted format from the video display to the video signal source. Another step is receiving the string of bit values in the video signal source and decrypting the string of bit values. A further step is dividing the string of bit values into multi-bit segments in both the video display and the video signal source. An additional step is selecting common a multi-bit segment in the string of bit values for both the video display and video signal source. Another step is sending a plurality of analog video channels in a switched order from the video signal source to the video display based on the common multi-bit segment. One more step is decoding the plurality of analog video channels in the video display using the common multi-bit segment to decode the switched order.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In a video protection system as described above, an unauthorized end user can intercept the signal as it exits the descrambler and before it enters the video display. This is a straightforward way for users to copy material after it has been descrambled. Some digital systems have encrypted a digital signal that is being sent into a digital display, monitor, or television, but analog video displays or television monitors have generally been engineered in a manner that they expect the video input in an unprotected format. In this sense, analog video displays do not "know" anything about the signal coming into them. This transmission link in an analog video system is vulnerable to attack by someone who understands the basic way in which video protection systems work with analog video displays. Even though the analog transmission link is vulnerable, it has not been apparent to those skilled in the art how to protect this analog link effectively.

Figure 1:
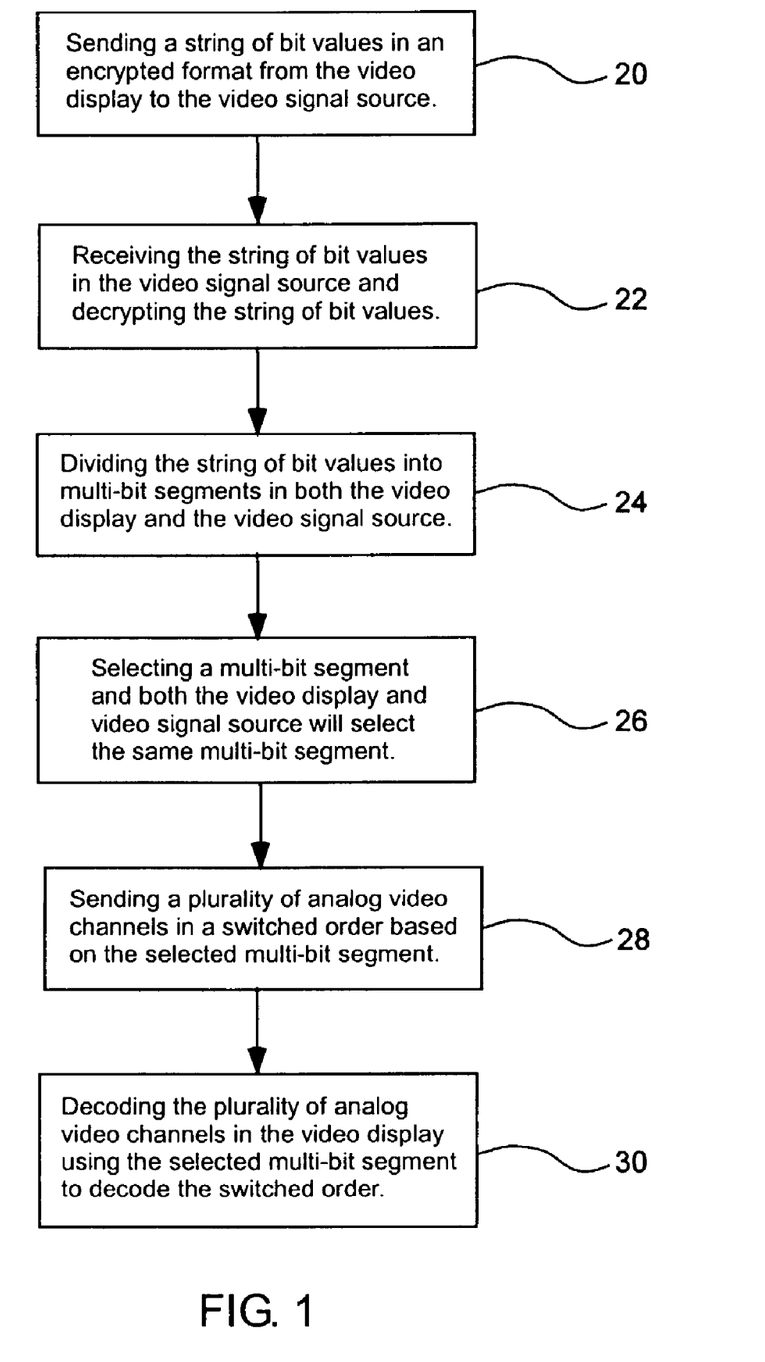
FIG. 1 is a flow chart of operations for protecting analog video signals in accordance with an embodiment of the present invention.

The present invention is a system and method for protecting an analog video signal sent from a video signal source to a video display enabled to receive a protected video signal. FIG. 1 illustrates a flow chart for an embodiment of a method of the present invention. The method includes the step of sending a string of bit values in an encrypted format from the video display to the video signal source in block 20. Another step is receiving the string of bit values in the video signal source and decrypting the string of bit values in block 22. Sending the string from the video display to the video signal source in an encrypted format prevents someone who may be listening from capturing the string and determining what the string contains. Next, the string of bit values is divided into multi-bit segments in both the video display and the video signal source in block 24. This means that the video display and the video source signal will each have the same set of multi-bit segments.

A common multi-bit segment in the string of bit values is selected and both the video display and video signal source will select the same multi-bit segment in block 26. The multi-bit segments can be any number of bits in groups, starting with 2 bits and ranging up to a large number of bits. One useful embodiment of a multi-bit segment length is 3 bits. A 3-bit value provides a value range of 0–7 and this value can be used in selecting a scrambled or switched order signal selected from a RGB, RBG, GBR, GRB, BRG, or BGR ordered signal. Thus, the numerical values of a multi-bit segment can each be associated with a switched order. Once a signal order has been selected, the next step is sending a plurality of analog video channels in the switched order from the video signal source to the video display as in block 28. After the switched or scrambled signal has been sent, the analog video channels in the video display are decoded using the common multi-bit segment in block 30. The decoding step allows the video display to present a clear video frame to the viewer.

In one example embodiment, the system can send a random 48-bit value from the video display to the video signal source. This 48-bit value can then be divided into 3-bit parts, which in turn creates 16 multi-bit segments. The video signal source (or host) and the video display can be synchronized as to which multi-bit segments are selected and in what order they are selected. In one embodiment, the video signal source and the video display will select the multi-bit segments sequentially from the beginning of the bit string until there are no more bits. Then the selection process will restart from the beginning of the bit string.

Alternatively, the multi-bit segments can be selected randomly or pseudo-randomly from the bit string. This means that a random or pseudo random starting point can be picked in the string and then a multi-bit segment can be generated starting at that given point. In this arrangement, multi-bit segments may or may not be re-used but it will be difficult for a person to crack even if they understand the underlying scheme because the transmission order of the channels can be randomized. Regardless of how the multi-bit segments are selected, both the video display and video signal source are synchronized to use the same multi-bit segment at any given time.

The selected multi-bit segment or value can be used for a selected period of time to switch the order of the plurality of analog video channels. Each selected multi-bit segment can be used for a line of video, multiple lines of video, each new video frame, or multiple frames of video. Even the length of time the multi-bit segment may be used can vary during a transmission. If the period of time for the multi-bit segment to be used is a varying length, both the video source signal and the video display will be synchronized as to the varying lengths of time the multi-bit segment will be used.

The string of bit values that is transmitted from the video signal source to the video display can be created in a number of ways. One way of creating the string of bit values is to generate a string of randomly generated bit values in the video display. The string can be a pre-determined length as in the example of a 48-bit string, but the length of the string can be any random length that can be generated by the video display as long as the length of the string is communicated to the video signal source. It is useful if the length of the string is a multiple of the length of the multi-bit segment length but this is not required. The string can also be pseudo-randomly generated by copying the string from part of a pre-stored data cache and randomly generating the remainder of the string. Those skilled in the art could also design other ways to easily generate such a string.

The string of bit values can be sent across the horizontal sync signal line during the time frame when the vertical sync signal is being sent and is blocking the horizontal sync signal. This allows the string to be sent on analog video interfaces that do not have extra data communications lines. In addition, the string can be sent through other data channels, if available, such as the display data channel (DDC) line in the VGA interface.

Figure 2:
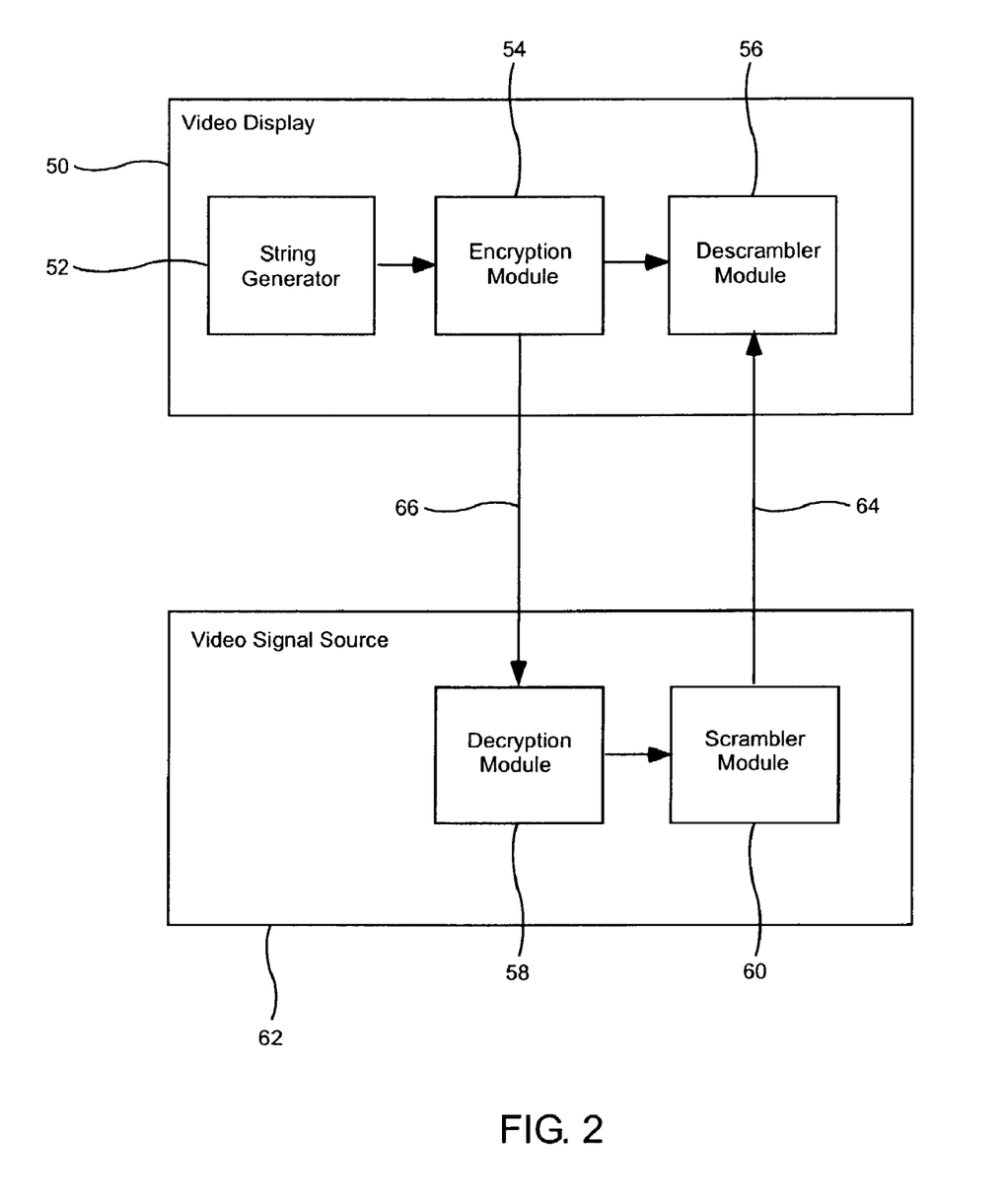
FIG. 2 is a block diagram illustrating an embodiment of a system for protecting analog video signals.

FIG. 2 illustrates a block diagram of components in an embodiment of the present invention for protecting a video signal. The diagram represents one possible implementation of the invention but other component configurations can be created. The present device includes a string generator 52 configured to generate a bit string. An encryption module 54 is provided that is in communication with the string generator and the encryption module can encrypt the bit string. A video display 50 is in communication with the encryption module and is configured to transmit the encrypted bit string 66 received from the encryption module. The video display is also enabled to receive a video signal for display.

A video signal source 62 is configured to receive the encrypted bit string 66. A decryption module 58, in the video signal source, can decrypt the bit string received by the video signal source and divide the bit string into multi-bit segments. The video signal source uses the multi-bit segment to transmit the video signal in a scrambled pattern and the video display uses the same multi-bit segment to descramble the video signal for display. The video signal source also transmits a video signal via a plurality of video channels 64. The video signal source sends the bit string or multi-bit segments to the scrambler module 60 that allows the scrambler module to determine the switched order in which the video channels will be sent. The descrambler module 56 in the video display uses the bit string or multi-bit segments in order to descramble the switched order in which the video channels are received.

Figure 3:
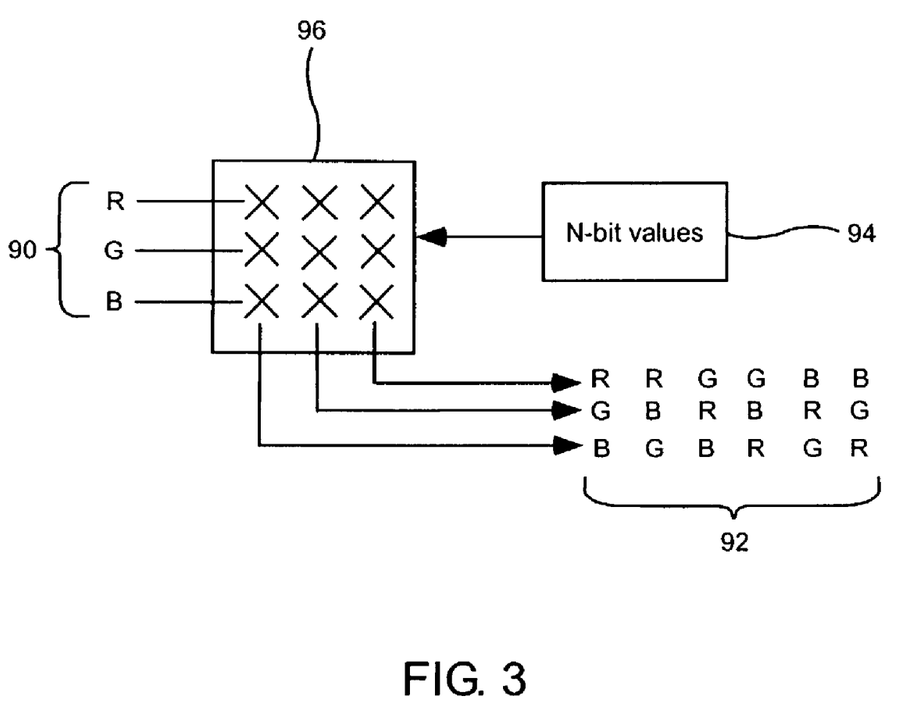
FIG. 3 illustrates a 3×3 crosspoint switch that can be used for scrambling an analog video signal as in an embodiment of the present invention.

One type of hardware module that can be used for the scrambler 60 and descrambler 56 is a crosspoint switch for scrambling or descrambling the video signal transmission. An example of a 3×3 crosspoint switch is depicted in FIG. 3. This example of a crosspoint switch is a logical explanation and not necessarily an actual physical implementation. The illustrated crosspoint switch 96 can be used as a scrambler module. The switch receives the video channels 90 in an unscrambled order and then the channels are scrambled or switched based on N-bit values 94 received that were selected from the bit string. In other words, the mapping of the input to output signals is determined by the 3-bit arrangements as described above. The scrambled video channel output 92 is then sent to the video display. FIG. 3 illustrates that many different scrambled or switched outputs are possible. An N-bit crosspoint switch can be used where the multi-bit segment is longer than 3 bits. For example, a 4 or 5 bit segment can be used to control a crosspoint switch. Both the video display and the video signal source can use a crosspoint switch to scramble and descramble the video signal. Alternatively, this scrambling or switching of the signal can be achieved in a system employing a common color-map form of output, which re-writes a color map in the video signal source and video display during each vertical blanking interval. Other methods known to those skilled in the art can be also used for mapping the switched or scrambled channels.

The method and system of the present invention can also include a synchronized multi-bit segment selector as part of the scrambler and descrambler modules contained within the video signal source and the video display to select a multi-bit pattern of a selected length within the bit string. In other words, there will be some means of synchronizing the multi-bit segment used by both the video signal source and the video display. The synchronization means can also synchronize the length of time the multi-bit segment is used for switching or scrambling the video signal.

When the system and method of the present invention is used with a video display that cannot recognize the scrambled or switched video signal, then the video display will essentially display 'noise' to the viewer or an eavesdropper on the video line. Even though the signal is copy or access protected using the present invention, it is valuable to be able to determine if the video display is compatible with the video signal protection system.

A video signal source that can determine whether or not it is sending a compatible video signal to a display that can receive the video signal allows the system to inform the user when an incompatible video display is being used. This avoids the situation where the user thinks there has been a hardware failure or some other problem because a clear signal is not displayed.

Figure 4:
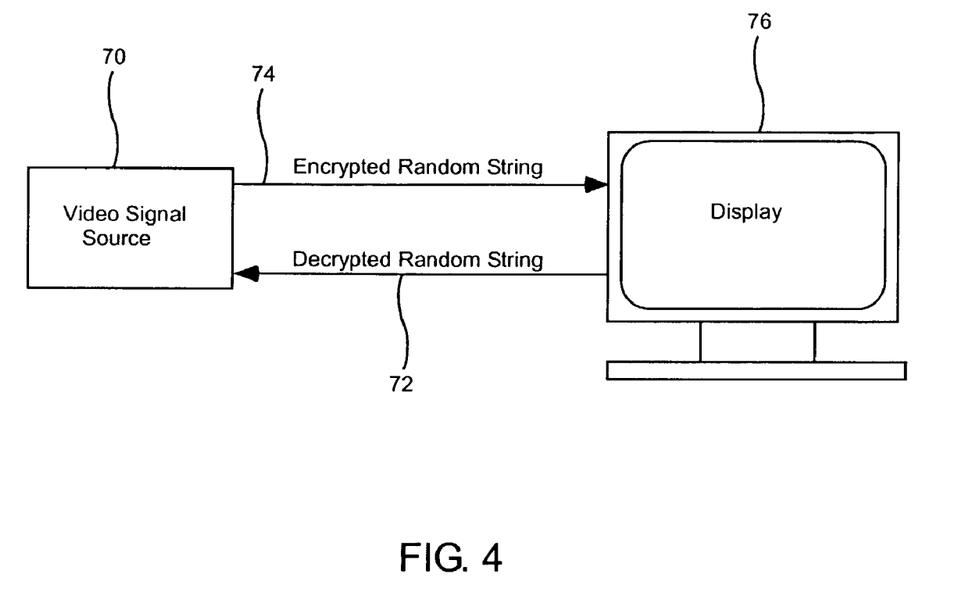
FIG. 4 is a block diagram of an embodiment of the present invention that provides a system for determining whether a video display is enabled to receive copy protected video signals.

FIG. 4 illustrates a video signal source 70 that checks to see whether the video display 76 is enabled to receive the copy-protected signal before sending the scrambled video signal. The video signal source investigates whether the video display is enabled to receive and decrypt the copy-protected signal by sending an encrypted handshake code. In one embodiment, the video signal source sends an encrypted random string 74 of a specified length to the video display 76. The video display can then respond during the next available data transmission window with the decrypted version of the original string 72. The video signal source can identify the display as an authorized receiving device, which is capable of using this method of protection, by comparing the received string data to the originally transmitted string. This is a challenge and response type of exchange and the random string can be encrypted using public-key techniques, which are well known to those skilled in the art. If the display is not the appropriate type, then the video signal source can present an error to the end user and refrain from sending a video signal to the video display.

Figure 5:
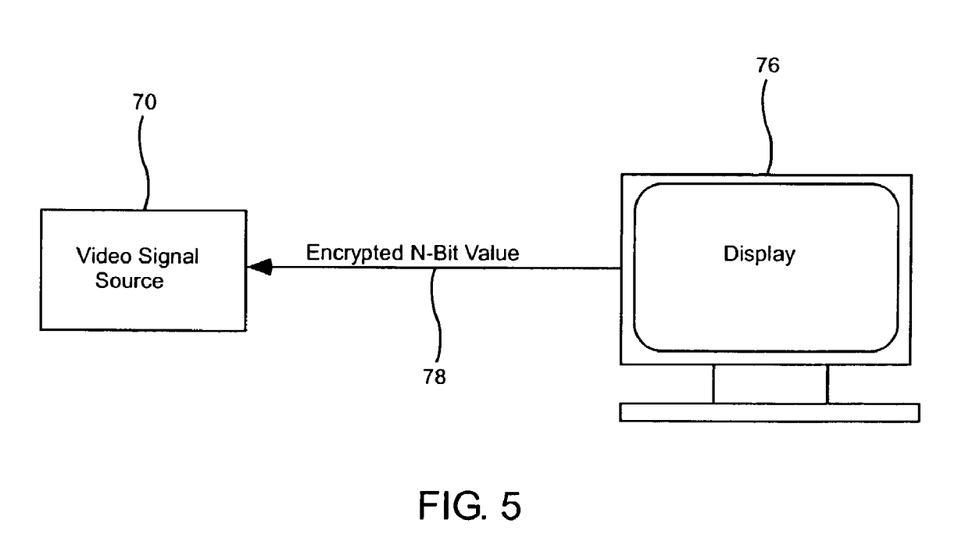
FIG. 5 is a block diagram illustrating a video display that is sending an encrypted bit string to a video signal source in an embodiment of the invention.

After the video display has been authorized, FIG. 5 illustrates that the video display will send an encrypted N-bit value to the video source signal 78. This is the string of bits that will be divided into multi-bit segments as described above and this string is used to scramble the video display signal. This string does not need to be returned to the video display. An advantage of sending the N-bit string in an encrypted fashion is that the video signal source and the video display will both have a copy of the decrypted version of the string, which has not been sent "in the clear" at any time over the video interface. This protects the integrity of the video scrambling.

Once the video signal source sends the original encrypted challenge to the video display and receives a decrypted response (as in FIG. 4), this means the video signal source has verified that there exists at least one authorized receiver on the interface. This does not imply that the video signal source knows there is not another unauthorized device trying to receive the copy-protected material or "listen in" on the same interface. Having the single authorized receiving device or video display transmit an encrypted N-bit value back to the video signal source better ensures that only the video signal source and the video display involved in the original challenge/response has access to this value or bit string.

An alternative embodiment of the present invention allows the video signal source or host to send the bit string to the displays. In this situation, it is possible to have the video signal source send this value out using the same encryption as was used for the original challenge string. In addition, a scheme that sends the bit string from the video signal source to the video display(s) will be more secure if it relies on a set of encryption/decryption keys that make the process more secure. For example, an encryption system where every device has its own private key can make such an arrangement more secure.

In the present invention, the analog video signal is sent directly from the analog video signal source to an analog video display. Directly is generally defined as being sent on a transmission cable or medium without any analog scrambling or descrambling components intervening on the line. Of course, simple filtering devices and similar circuits can be applied to the signal when it reaches the video display and this can still be considered a direct signal.

While this system has been described using the example of an analog interface, it can also be applicable to a digital transmission system in which the three color signals are normally assigned separate physical transmission paths or standardized channel mappings within the digital interface.

Figure 6:
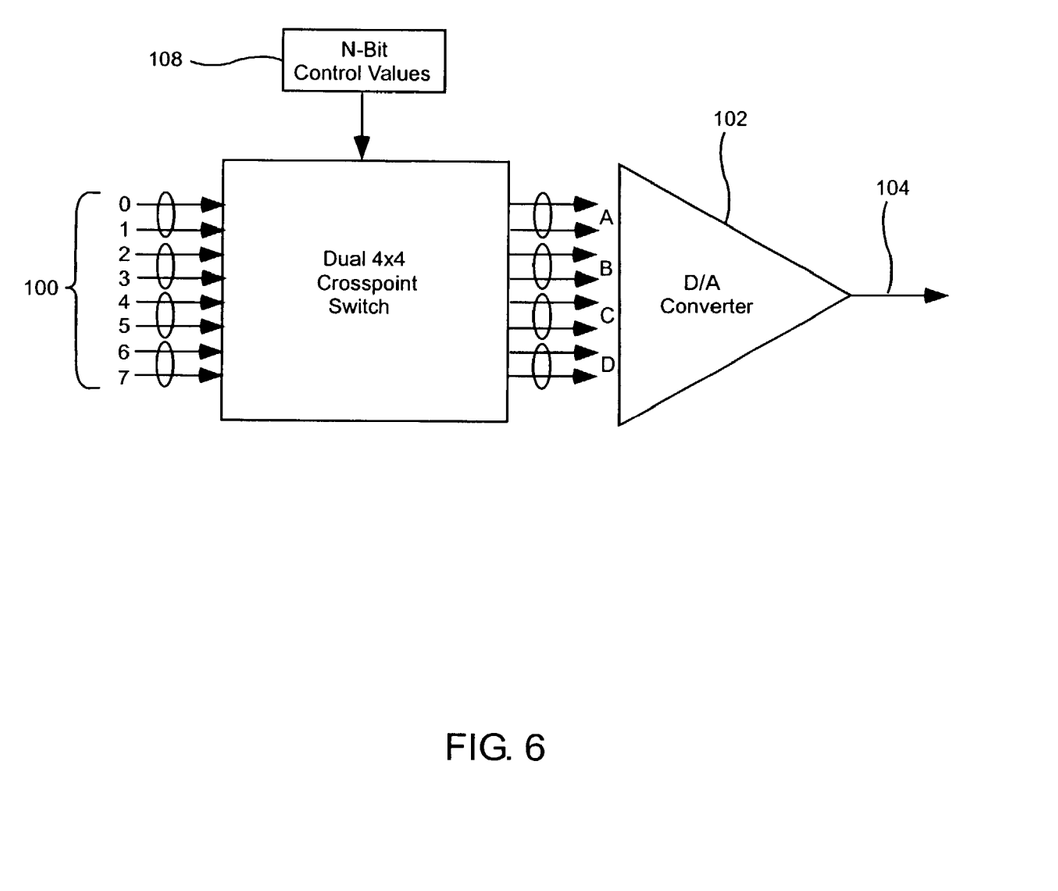
FIG. 6 illustrates a block diagram of a system for scrambling a digital signal that is converted and sent across an analog transmission line in an embodiment of the invention.

Another embodiment of the present invention for copy-protection of a video signal can be implemented for a digital interface system using the technique of scrambling an N-bit pattern at the video signal source. Rather than scrambling the assignment of the video signals to their physical channels, the assignment of the bits used to generate each pixel can also be scrambled on a frame-by-frame (or line-by-line) basis under the control of the bit string or pattern provided by the video display. FIG. 6 illustrates an example embodiment of digital video output that provides 8-bits of amplitude information 100 to the inputs of a digital-to-analog converter (DAC) 102 which then produces the analog red, green, and blue video signals 104.

Using the N-bit values 108 (4-bit as illustrated) provided by the display, the mapping of the values to the input of the DAC or the digital transmission path can be switched among 6 possible alternatives at the frame or line rate, and then the bit pattern can be repeated or changed to a new pattern. This has the advantage of rendering even luminance-only ("black-and-white") transmission unusable. This embodiment does add cost, additional complexity, and requires an analog-to-digital conversion so that the bit-mapping may then be re-sampled in the digital domain at the display. In other words, the system is transmitting an analog signal that is converted from digital form and then back into digital form at the video display which increases the cost of this embodiment.

In summary, the frame or line rate scrambling of the video signal interface assignment renders the image unusable to any device which cannot unscramble the signals in the right sequence at the right time. Since the sequencing can be controlled by a random number, pseudo-random sequence, or a pre-programmed sequence, any other device besides the video display and the video signal source will not be able to access the sequencing. The sequencing can be changed quickly without any impact on the final image and this makes it difficult for an unauthorized device to recover the correct image for any useful length of time.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for protecting an analog video signal sent from a video signal source to a video display enabled to receive a protected video signal, comprising the steps of:
   sending a string of bit values in an encrypted format from the video display to the video signal source;
   receiving the string of bit values in the video signal source and decrypting the string of bit values;
   dividing the string of bit values into multi-bit segments in both the video display and the video signal source;
   selecting a common multi-bit segment in the string of bit values for both the video display and video signal source;
   sending a plurality of analog video channels in a switched order from the video signal source to the video display based on the common multi-bit segment; and
   decoding the plurality of analog video channels in the video display using the common multi-bit segment to decode the switched order.

2. A method as in claim 1, further comprising the step of using the common multi-bit value for a selected period of time to switch the order of the plurality of analog video channels.

3. A method as in claim 2, further comprising the step of selecting separate multi-bit values for each time period during which the sending and decoding steps take place.

4. A method as in claim 1, further comprising the step of selecting a separate multi-bit value for each separate video frame.

5. A method as in claim 1, further comprising the step of determining that a video display is enabled to receive the protected signal before sending the protected signal.

6. A method as in claim 5, further comprising the step of determining that the video display is enabled to receive the protected signal by sending an encrypted handshake code.

7. A method as in claim 1, further comprising the step of sending the string of bit values during a vertical sync period.

8. A method as in claim 1, further comprising the step of dividing the string of bit values into 3-bit parts.

9. A method as in claim 1, wherein the step of sending a plurality of analog video channels in a switched order, further comprises the step of sending the plurality of analog video signals in a switched order selected from the group of switched orders consisting of RGB, RBG, GBR, GRB, BRG, and BGR.

10. A method as in claim 9, further comprising the step of defining a switched order that corresponds with a numerical value of each multi-bit segment.

11. A method as in claim 1, wherein the string of bit values is a string of randomly generated bit values.

12. A method as in claim 11, wherein the string of bit values has pre-determined length.

13. A method as in claim 1, wherein the analog video signal is sent directly from the analog video signal source to an analog video display.

14. A device for protecting a video signal, comprising:
   a string generator configured to generate a bit string;
   an encryption module in communication with the string generator to encrypt the bit string;
   a video display, in communication with the encryption module, configured to transmit the encrypted bit string received from the encryption module and to receive a video signal;
   a video signal source configured to receive the encrypted bit string and to transmit the video signal to the video display via a plurality of video channels;
   a decryption module, in the video signal source, configured to decrypt the bit string received by the video signal source and to divide the bit string into multi-bit segments; and
   wherein the video signal source uses the multi-bit segment to transmit the video signal in a scrambled pattern to the video display and the video display uses the same multi-bit pattern to descramble the video signal for display.

15. A device as in claim 14, wherein the bit string is a pre-determined length.

16. A device as in claim 14, further comprising a crosspoint switch configured to be used to scramble or descramble the video signal for the display.

17. A device as in claim 14, further comprising a synchronized multi-bit segment selector contained within the video signal source and the video display to select a multi-bit pattern of a selected length within the bit string.

18. A device as in claim 14, further comprising a challenge message that is sent to the video display from the video signal source.

19. A device as in claim 18, further comprising a response message that is sent to the video signal source from the video display in reply to the challenge message to verify the video display can receive a scrambled video signal.

20. A method for protecting a video signal sent from a video signal source to a video display, comprising the steps of:

sending a random string of bit values in an encrypted format from the video display to the video signal source;

decrypting the random string of bit values when the random string is received in the video signal source;

dividing the random string of bit values into 3-bit segments in both the video display and the video signal source;

selecting a common 3-bit segment in the random string that has not been used yet, for both the video display and video signal source;

sending three channels of a video signal in a scrambled order from the video signal source to the video display based on a value of the common 3-bit segment; and decoding the three channels of the video signal in the video display using the common 3-bit segment.

21. A method as in claim 20, further comprising the step of using at least a 48-bit value as the random string of bit values.

22. A method as in claim 20, further comprising the step of associating each integer value for the 3-bit values with the scrambled formats comprising RGB, RBG, GBR, GRB, BRG, and BGR.

23. A method as in claim 20, further comprising the steps of:

sending an encrypted challenge string from the video signal source to the video display;

decrypting the challenge string in the video display; and sending the decrypted challenge string back to the video signal source as a response to verify that the video display can receive a scrambled video signal.

* * * * *

UNITED STATES PATENT AND TRADEMARK OFFICE
CERTIFICATE OF CORRECTION

| | |
|---|---|
| PATENT NO. | : 7,113,597 B2 |
| APPLICATION NO. | : 10/280592 |
| DATED | : September 26, 2006 |
| INVENTOR(S) | : Robert L. Myers |

It is certified that error appears in the above-identified patent and that said Letters Patent is hereby corrected as shown below:

On the title page, item (73), in "Assignee", in column 1, line 2, delete "LP.," and insert -- L.P., --, therefor.

Signed and Sealed this

Twentieth Day of January, 2009

JON W. DUDAS
*Director of the United States Patent and Trademark Office*